United States Patent
Scotta et al.

(10) Patent No.: US 9,871,911 B1
(45) Date of Patent: Jan. 16, 2018

(54) VISUALIZATIONS FOR INTERACTIONS WITH EXTERNAL COMPUTING LOGIC

(71) Applicant: Microsoft Technology Licensing, LLC, Redmond, WA (US)

(72) Inventors: Lucas Matthew Scotta, Seattle, WA (US); Srinivas Raghu Gatta, Redmond, WA (US); Michael Burt Goulding, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/283,157

(22) Filed: Sep. 30, 2016

(51) Int. Cl.
| | |
|---|---|
| *H04M 3/42* | (2006.01) |
| *H04M 1/725* | (2006.01) |
| *H04L 29/08* | (2006.01) |
| *H04W 4/00* | (2009.01) |
| *H04W 4/20* | (2009.01) |

(52) U.S. Cl.
CPC ........ *H04M 1/72583* (2013.01); *H04L 67/34* (2013.01); *H04W 4/001* (2013.01); *H04W 4/20* (2013.01)

(58) Field of Classification Search
CPC ... H04M 1/72583; H04M 4/001; H04W 4/20; H04L 67/34; H04L 12/24; G06F 17/3052; G06F 17/30994; G06F 17/30554; G06F 3/04842; G06F 2217/16; G06T 11/206; G06Q 2230/00; G06Q 50/20
USPC ......... 455/414.1, 41.2, 456.3; 709/223, 224; 345/441, 672, 440, 419
See application file for complete search history.

(56) References Cited

U.S. PATENT DOCUMENTS

| | | | | |
|---|---|---|---|---|
| 6,301,579 | B1 * | 10/2001 | Becker | ............. G06F 17/30592 |
| 6,529,900 | B1 * | 3/2003 | Patterson | .......... G06F 17/30572 |
| 7,827,228 | B2 | 11/2010 | Emberton et al. | |
| 8,169,958 | B2 | 5/2012 | Torres et al. | |
| 8,190,213 | B2 | 5/2012 | Sierawski | |

(Continued)

FOREIGN PATENT DOCUMENTS

| | | | | |
|---|---|---|---|---|
| CN | 103678511 A | * | 3/2014 | |
| CN | 105190600 A | * | 12/2015 | ............. G06T 13/80 |

(Continued)

OTHER PUBLICATIONS

Walter, Derek., "Get to know iOS 8: Customize your Notification Center with handy new widgets", Published on: Sep. 19, 2014 Available at: http://www.macworld.com/article/2686117/get-to-know-ios-8-customize-your-notification-center-with-handy-new-widgets.html.

(Continued)

*Primary Examiner* — Mahendra Patel
(74) *Attorney, Agent, or Firm* — Workman Nydegger

(57) ABSTRACT

Allowing a user to interact with external computing logic through a standardized user interface visualization. For instance, a user might be able to initiate an action of the external computing logic by one click, by interfacing with a slider control, and so forth. As a result of such interaction, a notification generated by the corresponding logic may be presented to a user. The notification could be presented in the same user interface visualization that was interacted with to trigger the external computing logic, or may be presented in a separate visualization, or in both. The notification could also be sent to one or more external computing entities, for instance, an email system, a mobile device, and so forth.

17 Claims, 10 Drawing Sheets

(56) References Cited

U.S. PATENT DOCUMENTS

| | | | |
|---|---|---|---|
| 8,832,203 | B2 | 9/2014 | Borenstein et al. |
| 9,727,636 | B2* | 8/2017 | Olenick ............ G06F 17/30654 |
| 2003/0023952 | A1 | 1/2003 | Harmon et al. |
| 2006/0080901 | A1* | 4/2006 | Wagner ................. A47F 10/00 52/36.1 |
| 2007/0288883 | A1 | 12/2007 | Soroker et al. |
| 2008/0091774 | A1 | 4/2008 | Taylor et al. |
| 2011/0210986 | A1* | 9/2011 | Goutsev .................... G06F 8/38 345/672 |
| 2011/0246925 | A1* | 10/2011 | Marchand ............. G06Q 10/06 715/772 |
| 2012/0041990 | A1* | 2/2012 | Kreindlina ........ G06F 17/30572 707/805 |
| 2012/0197728 | A1 | 8/2012 | Luna et al. |
| 2013/0139113 | A1 | 5/2013 | Choudhary et al. |
| 2013/0307843 | A1* | 11/2013 | Sikka ...................... G06T 15/00 345/419 |
| 2014/0043337 | A1* | 2/2014 | Cardno ............ G06F 17/30994 345/440 |
| 2014/0097961 | A1 | 4/2014 | Vaglio et al. |
| 2014/0282053 | A1* | 9/2014 | Hauschild ............. G06F 3/0481 715/744 |
| 2015/0033173 | A1* | 1/2015 | Im ..................... G06F 17/30716 715/771 |
| 2015/0040065 | A1 | 2/2015 | Bianco et al. |
| 2015/0324090 | A1* | 11/2015 | Kostirev ............... G06F 19/325 715/835 |
| 2016/0042540 | A1* | 2/2016 | Drucker ................ G06T 11/206 345/440 |
| 2016/0231915 | A1* | 8/2016 | Nhan .................. G06F 3/04847 |
| 2016/0328219 | A1* | 11/2016 | Kureshy .................... G06F 8/35 |
| 2017/0235848 | A1* | 8/2017 | Van Dusen ....... G06F 17/30979 |

FOREIGN PATENT DOCUMENTS

| | | | |
|---|---|---|---|
| CN | 105740377 A | * | 7/2016 |
| CN | 105765577 A | * | 7/2016 ....... G06F 17/30398 |
| WO | 2011075111 A2 | | 6/2011 |

OTHER PUBLICATIONS

Yamshon, Leah., "The best Notification Center widgets in iOS 8 right now", Published on: Sep. 26, 2014 Available at: http://www.macworld.com/article/2687656/the-best-notification-center-widgets-in-ios-8-right-now.html.

Khoury, Rita El., "WhatsApp Adds Quick Reply From the Notification, Multiple Contact Selection, Solid Wallpaper Colors, and Finally Dumps a Gingerbread Remnant", Published on: Mar. 30, 2016 Available at: http://www.androidpolice.com/2016/03/30/whatsapp-adds-quick-reply-from-the-notification-multiple-contact-selection-solid-wallpaper-colors-and-finally-dumps-a-gingerbread-remnant/.

"Floatify v6.00—Advanced notifications—iOS Style QuickReply", Published on: Jun. 16, 2015 Available at: https://www.youtube.com/watch?v=GhadU551UW8.

"App Widgets", Retrieved on: May 16, 2016 Available at: https://developer.android.com/guide/topics/appwidgets/index.html#Manifest.

Aguilar, Nelson., "How to Launch Apps, Tasks, & Websites Directly from Your iPhone's Notification Center", Published on: May 17, 2015 Available at: http://ios.wonderhowto.com/how-to/launch-apps-tasks-websites-directly-from-your-iphones-notification-center-0161008.

Clover, Juli., "Apple Releases iOS 9.3 With Night Shift, New Quick Actions, App Improvements, '1970' Bug Fix and More", Published on: Mar. 21, 2016 Available at: http://www.macrumors.com/2016/03/21/apple-releases-ios-9-3/.

Horowitz, Paul., "How to Add, Remove, & Rearrange Widgets in Notification Center of iOS", Published on: Oct. 2, 2014 Available at: http://osxdaily.com/2014/10/02/customize-widgets-notification-center-ios/.

Chan, Christine., "Make the Most out of your iPhone Notification Center", Retrieved on: May 16, 2016 Available at: http://appadvice.com/collection/best-widgets-for-your-iphone-notification-center.

Sankin, Aaron., "How to get a good rating from your Uber driver", Published on: Jul. 29, 2014 Available at: http://www.dailydot.com/technology/how-to-get-a-good-uber-passenger-rating/.

Shetty, Anuradha, "Book Olacabs in Mumbai with one-touch iPhone app", Published on: Jul. 16, 2012 Available at: http://m.tech.firstpost.com/news-analysis/book-olacabs-in-mumbai-with-one-touch-iphone-app-30175.html.

Pathak, Khamosh, "Use Truecaller's Notification Center Widget on Your iPhone to Quickly Lookup Numbers", Retrieved on: Mar. 28, 2016 Available at: http://techpp.com/2015/12/28/iphone-truecaller-trick/.

"Use AssistiveTouch on your iPhone, iPad, or iPod touch", Published on: Nov. 12, 2015 Available at: https://support.apple.com/en-in/HT202658.

Muchmore, Michael, "How to Use Windows 10 Action Center", Published on: Jul. 17, 2015 Available at: http://in.pcmag.com/windows-10-preview-release-date-news-features/94317/feature/how-to-use-windows-10-action-center.

"Pin Apps to Your Mac's Finder Toolbar for Shortcuts Galore", Published on: Oct. 30, 2013 Available at: http://www.wired.com/2013/10/finder-toolbar-app-shortcut/.

Ron Amadeo, "Android 7.0 Nougat review—Do more on your gigantic smartphone", Published on: Aug. 22, 2016. Available at: http://arstechnica.com/gadgets/2016/08/android-7-0-nougat-review-do-more-on-your-gigantic-smartphone/6/#h1.

Dallas Thomas, "Add Your Own Quick Settings Tiles in Android Nougat", Published on: Nov. 15, 2016. Available at: http://android.wonderhowto.com/how-to/add-your-own-quick-settings-tiles-android-7-0-nougat-0173307/.

"Android 7.0 for Developers", Accessed Jul. 27, 2017. Available at: https://developer.android.com/about/versions/nougat/android-7.0.html#tile_api.

"TileService", Accessed Jul. 27, 2017. Available at: https://developer.android.com/reference/android/service/quicksettings/TileService.html.

\* cited by examiner

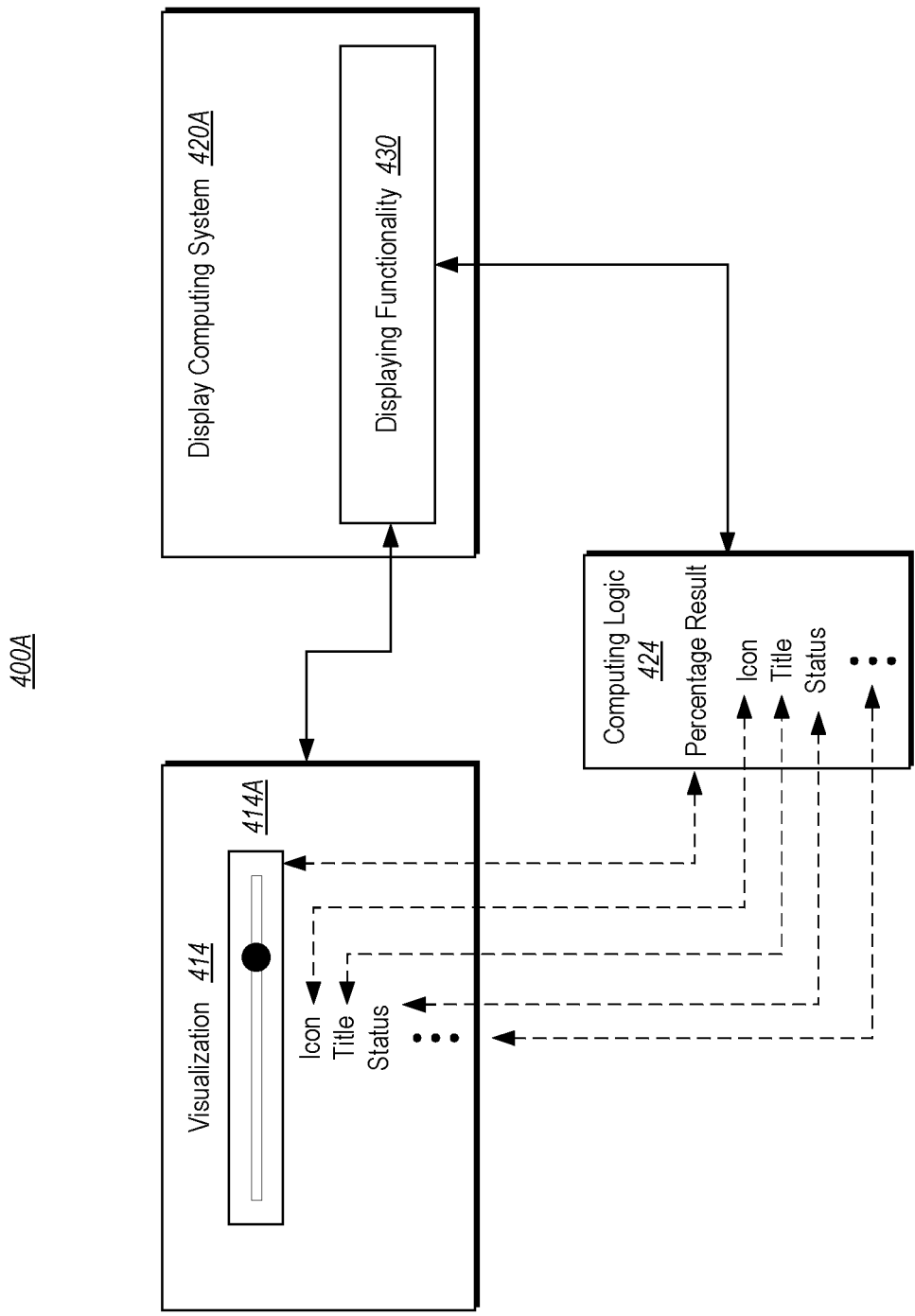

VISUALIZATIONS FOR INTERACTIONS WITH EXTERNAL COMPUTING LOGIC

BACKGROUND

Conventional computing systems presently provide a wide assortment of computing functionality often in the form of applications, operating system functionality, and/or other computing logic (referred to hereinafter collectively as "computing components"). Often, these various computing components are presented as visualizations to a user (e.g., via icons, widgets, and so forth), to allow the user to organize access to the computing component itself.

For instance, by appropriate manipulation of the visualization (and/or via other gestures or input), an application may be pinned to a portion of the user interface (such as a taskbar). As another example, the visualization may be placed on the home screen of a computing system or a mobile device. This causes the visualization to behave as a kind of shortcut that allows a user to access the application conveniently without going through more complex steps required for other computing components for which a shortcut has not been created.

The shortcut allows a user to open the application. The user typically thereafter interfaces within the application in the usual way to accomplish their desired purpose. For example, if a user desires to use a ride request application to request a ride from one location to another, the user first launches the application, then confirms where the user wants the car to pick up, then chooses the car type, and finally displays payment information and completes the request.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

At least some embodiments described herein relate to allowing users to interact with external computing logic that is external to the operating system substantially instantaneously through a collection of visualizations that are generated by the operating system via the use of populated templates. The external computing logic might be, for instance, an application run by the operating system, or an application that is run on a different computing system altogether. The system displays the collection of standardized visualizations, each of which being associated with particular external computing logic. A user's interaction with a particular visualization could send a value of a parameter to the particular external computing logic substantially instantaneously. For instance, a user might start an action of the external computing logic by a single click, by interfacing with a slider control, and so forth.

In at least some embodiments described herein, after the user interacts with the associated visualization, the operating system receives correspondence from the external computing logic and appropriately notifies the user. For instance, the notifications might be presented in the same user interface visualization associated with the external computing logic, or in a separate visualization, or in both. Also the notifications might be sent to an external entity such as an email system, a mobile device and so forth. The communications between the operating system and the external computing logic may be made without having the external computing logic run in the foreground.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 4A illustrates an example of a visualization including a slider control, which may be interacted with in order to adjust the percentage result of an external computing logic.

DETAILED DESCRIPTION

At least some embodiments described herein relate to allowing users to interact with external computing logic that is external to the operating system substantially instantaneously through a collection of visualizations that are generated by the operating system via the use of populated templates. The external computing logic might be, for instance, an application run by the operating system, or an application that is run on a different computing system altogether. The system displays the collection of standardized visualizations, each of which being associated with particular computing logic. A user's interaction with a particular visualization could send a value of a parameter to the particular external computing logic substantially instantaneously. For instance, a user might start an action of the external computing logic by a single click, by interfacing with a slider control, and so forth.

In at least some embodiments described herein, after the user interacts with the associated visualization, the operating system receives correspondence from the external computing logic, and appropriately notifies the user. For instance, the notifications might be presented in the same user interface visualization associated with the external computing logic, or in a separate visualization, or in both. Also the notifications might be sent to an external entity such as an email system, a mobile device and so forth.

Because the principles described herein operate in the context of a computing system that allows users to interact with external computing logic, a computing system with respect to FIGS. 1 and 1A, as well as user interface visualizations on a display will first be described as enabling technologies for the principles described herein. Thereafter, further details regarding how users are permitted to interact with external computing logic, including negotiating with particular computing logic, receiving notifications from the computing logic, and initiating a particular action will be described with respect to FIGS. 2 through 7.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. An example computing system is illustrated in FIG. 1.

Figure 1:
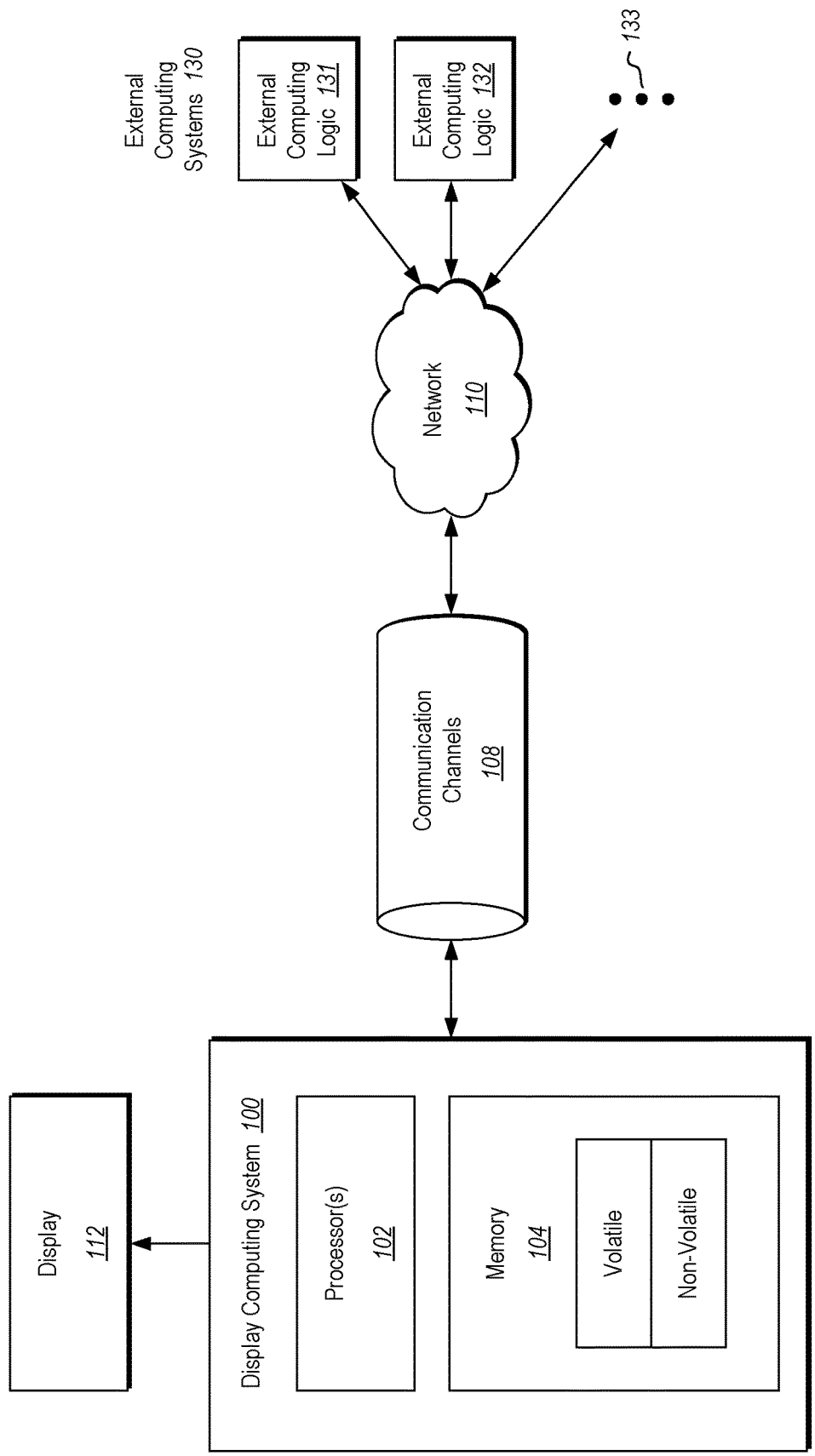
FIG. 1 symbolically illustrates an example computing system and external computing logic that communicate with each other in accordance with the principles described.
Figure 1A:
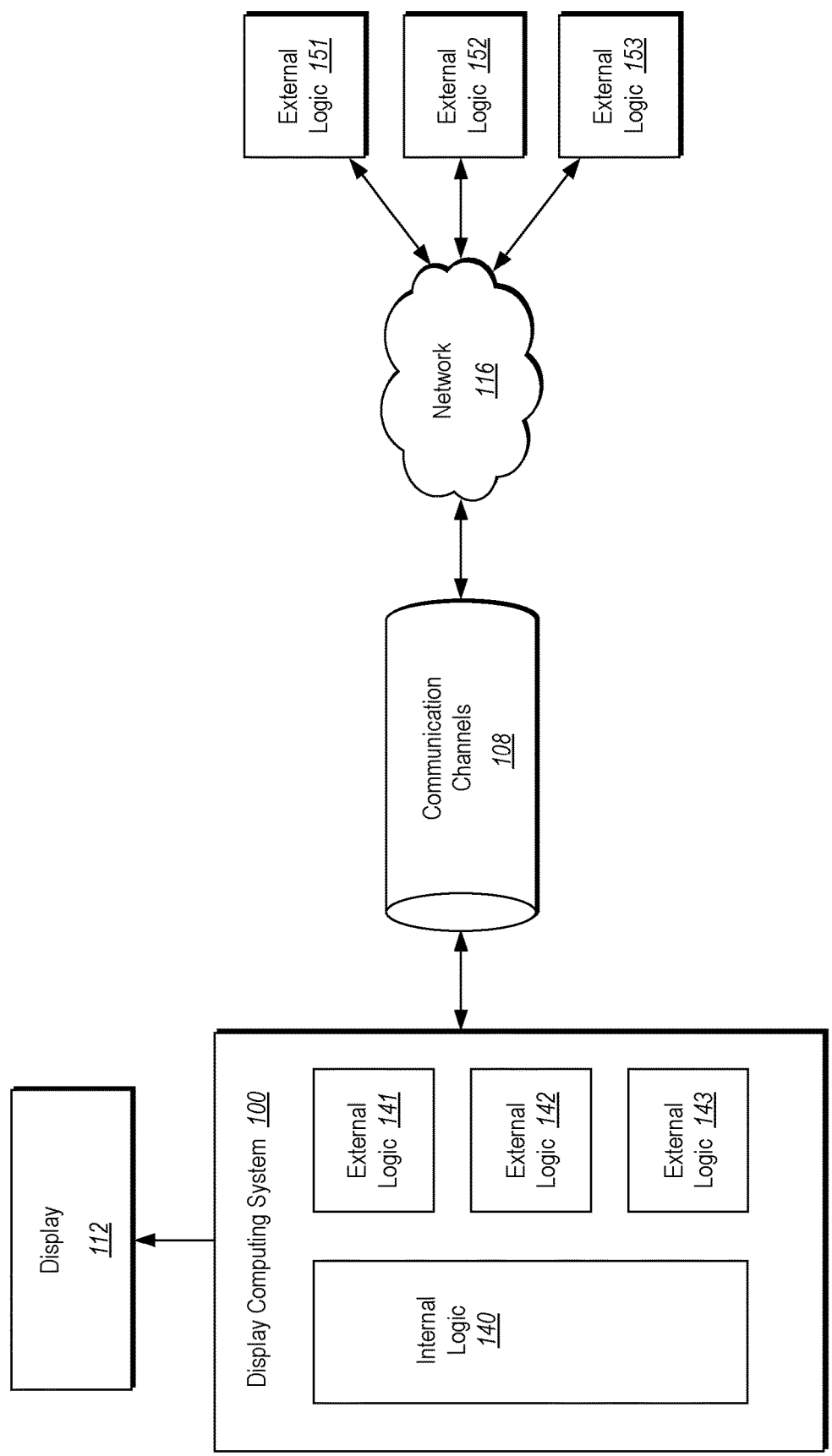
FIG. 1A illustrates that the computing system may run external computing logic that is either internal to the computing system or external to the computing system—thus the computing logic is "external" to the extent that it runs outside of the operating system.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

The computing system 100 also includes a display 112 on which a user interface, such as the user interface visualizations here, may be rendered. Such user interface visualizations may be generated in computer hardware or other computer-represented form prior to rendering. The presentation and/or rendering of such user interfaces may be performed by the computing system 100 by having the processing unit(s) 102 execute one or more computer-executable instructions that are embodied on one or more computer-readable media. Such computer-readable media may form all or a part of a computer program product.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

The computing system 100 displays user interfaces to its users in the display 112. The computing system 100 is hereinafter referred to as a "display computing system". External computing systems 130 could be a computer network and/or a resource service that is remote to the display computing system 100. As illustrated, the external computing systems 130 run a plurality of external computing logic 131 through 133. External computing logic, if any, running on the external computing systems 130 communicate with the display computing system 100 through various channels and networks, for instance, internet, cable, and so forth.

Although two external computing logics 131 and 132 are shown in FIG. 1, the ellipses 133 represent that the principles described herein may have external computing logic running on the display computing system 100 and/or any number (zero or more) external computing systems. Additionally, external logic may run on the display computing system 100. In one example, the external computing logic runs on only the display computing system 100. In another example, the external computing logic runs only on the external computing systems 130. In yet another example, external computing logic runs on both the display computing system 100 and the external computing systems 130. Such an example is illustrated in FIG. 1A In yet another example, external computing logic runs on both the display computing system 100 and the external computing systems 130. Such an example is illustrated in FIG. 1A. In FIG. 1A, the display computing system 100 includes internal logic 140 that is internal to the operating system of the display computing system 100. The display computing system 100 also runs external logic 141, 142 and 143. On the other hand, external computing logic which communicate with the display computing systems 100 (such as external computing logic 131 and/or 132) over the communication channels 108 and network 110 may operate external logic 151, 152 and 153. In one embodiment, external computing logic 141 through 143 may be thought of as apps running on a local system, and external computing logic 151 through 153 might be web services.

In one example, the external computing logic 141 through 143 within the display computing system 100 coordinates with the external computing logic 151 through 153 within the external computing system 130 to accomplish the function described herein. As an example, external computing logic 141 might communicate with external computing logic 151 (e.g., one-to-one), external computing logic 142 might communicate with external computing logic 152 and 153 (e.g., one-to-many), and external computing logic 143 might communicate with no other computing logic (e.g., one-to-zero).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
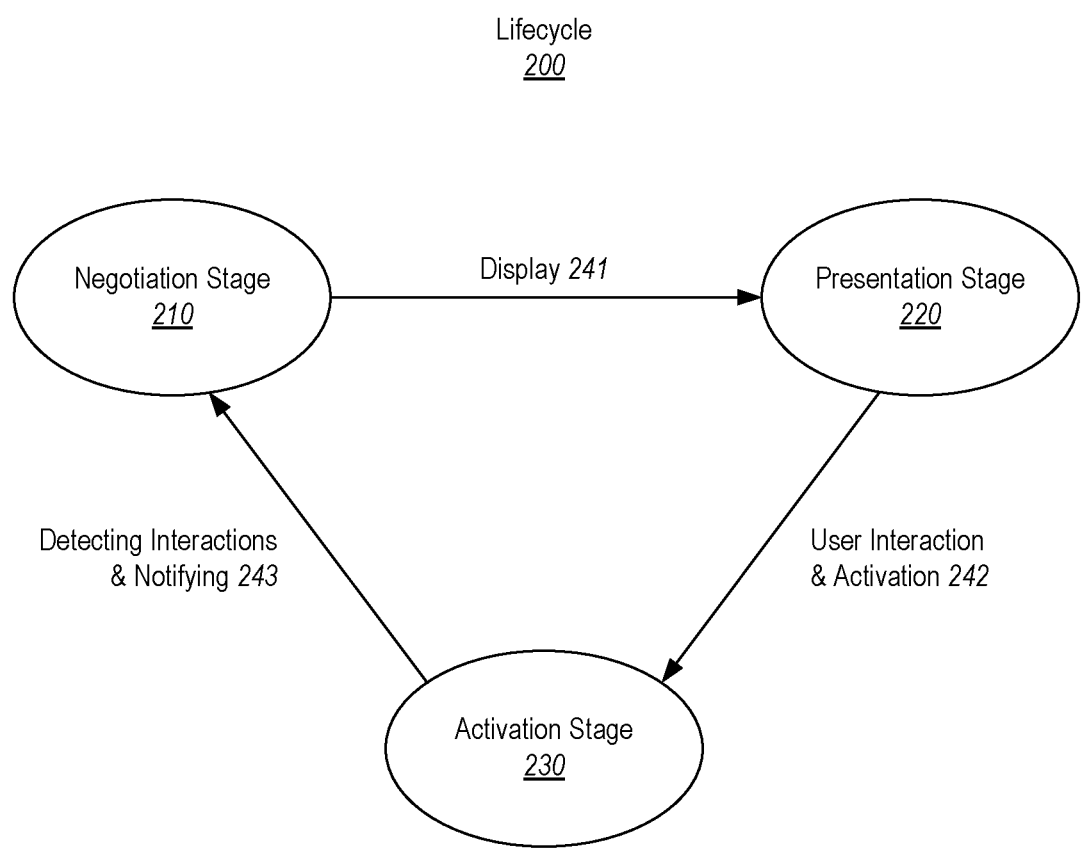
FIG. 2 illustrates the lifecycle in which the principles described herein may operate, and which includes three stages; namely, a negotiation stage, a presentation stage, and an activation stage.

FIG. 2 illustrates the lifecycle 200 in which the principles described herein may operate. The lifecycle 200 is with respect to a respective visualization and corresponding computing logic. Each visualization and corresponding computing logic may have an independent lifecycle that does not necessarily depend on the lifecycle of any other visualization and computing logic. As illustrated, the lifecycle 200 includes three stages 210, 220, 230 of operation that occur between a display computing system 100 on the one side, and computing logic that is to perform actions when the displayed visualization is activated on the other side. The lifecycle 200 starts at the negotiation stage 210, continues through presentation stage 220 (as represented by arrow 241), transitions to the activation stage 230 (as represented by arrow 242), then goes back to the negotiation stage 210 (as represented by arrow 243). Thus, the lifecycle may repeat cyclically.

The first stage is the negotiation stage 210, which can happen before (and even perhaps well before) any of the other illustrated stages. The other stages are the presentation stage 220 and the activation stage 230. In the negotiation stage 210, the display computing system negotiates with the computing logic (e.g., external computing logic) for purposes of establishing what is to appear in a visualization during the presentation stage 220, what events can trigger the activation stage 230, what information is to be exchanged as part of activation, and so forth. Then the display computing system 100 presents a user interface that includes a portion that includes multiple visualizations in the display 112, such that the lifecycle transitions (see arrow 241) from negotiation stage 210 to presentation stage 220. Each visualization is associated with corresponding computing logic. The presentation stage is further illustrated below in FIGS. 3, 3A, 4 and 4A.

After the visualizations are presented, a user may interact with a visualization thereby activating the particular computing logic to perform some function, such that the lifecycle transitions (see arrow 242) from presentation stage 220 to activation stage 230. In the activation stage 230, when a particular visualization is activated, the corresponding computing logic is activated to perform a particular action. The activation stage is further illustrated with respect to external computing logic below in FIG. 5.

After the activation stage, the computing logic responds to and negotiates with the display computing system based on the action that is triggered, so that the lifecycle transitions (see arrow 243) from activation stage 230 to negotiation stage 210. Then, the display computing system may further populate the template instance with additional and/or replacement content, such as notifications. At that point, the lifecycle transitions from negotiation stage 210 to presentation stage 220 again. This is described in further detail below in FIG. 6. Thus, the cycle may repeat with further notifications being displayed upon further activation.

Figure 3:
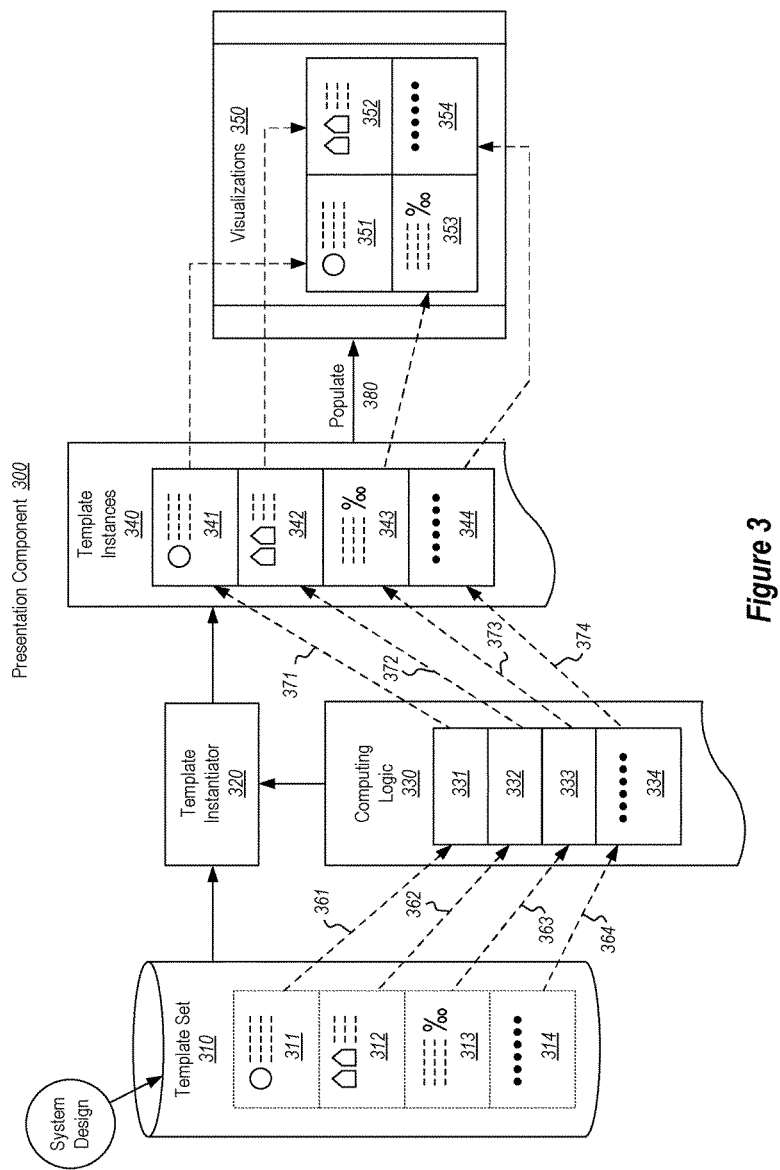
FIG. 3 illustrates a presentation stage environment that employs a computing system to present visualizations to a user.

FIG. 3 illustrates the presentation stage environment 300. After the initial negotiation stage 210 of FIG. 2, the display computing system creates a user interface portion on display 112 that includes a collection of visualizations 350. The display computing system 112 provides a set of one or more visualization templates 310 for purposes of generating visualizations that may be activated. Arrow 241 in FIG. 2 represents that the lifecycle transitions from negotiation stage 210 to presentation stage 220.

For instance, as illustrated, the set of templates 310 includes templates 311 through 313 among potentially more (or less) as represented by the ellipses 314. The templates 310 define the format of the visualizations, such as size, font, color, location, content, etc. They also define the parameters that users and computing logic could negotiate. By restricting the number of templates (even to perhaps just one) and/or ensuring that the templates themselves have common features, a consistent experience may be provided across different computing functionalities.

In preparation for creating a visualization, template instantiator 320 selects one of the templates in the set of templates 310 for a particular computing logic 330 that supports that visualization. Template instantiator 320 may select a template based on the system design, the user's preference, a functionality of the computing logic, selection policy, and/or any other appropriate selection criteria.

The computing logic 330 represents one or more computing logic that negotiates with the display computing system. For instance, in FIG. 3, the computing logic 330 is illustrated as including computing logic 331 through 333 among potentially many more as represented by the ellipses 334. The ellipses 334 also represent general flexibility in the numbers of computing logic that are within the set of computing logic 330, and so there may even be one or two of such computing logic within the computing logic 330. Furthermore, the number of computing logic within the set of computing logic 330 may vary over time.

The template instances 340 represent multiple template instances that are each based on one or more templates of the template set 310. For instance, the template instances 340 are illustrated in FIG. 3 as including template instances 341 through 343 among potentially more (or less) as represented by the ellipses 344. Template instantiator 320 creates a template instance for each particular computing logic based on the template the template instantiator 320 selects. In this case, template instance 341 is based on template 311 as symbolized by the content of the template instance 341 appearing similar to the content of the template 311. The same symbolization is used to also show that template instance 342 is based on template 312, and template instance 343 is based on template 313. To further distinguish the templates from the corresponding template instance, the templates themselves are illustrated as having dashed-lined borders, whereas the template instance are illustrated as having solid-lined borders. In the particular example that follows, assume that template instance 341 is associated with computing logic 331 (as represented by line 371) and as an instance of template 311 (as represented by line 361), that template instance 342 is associated with computing logic 332 (as represented by line 372) and as an instance of template 312 (as represented by line 362), and that template instance 343 is associated with computing logic 333 (as represented by line 373) and as an instance of template 313 (as represented by line 363).

After the template instantiator 320 creates the template instances 340, the display computing system populates (as represented by arrow 380) the instances in the visualizations in its user interface portion 350. The user interface portion 350 is illustrated as including visualizations 351 through 353 among potentially many more as represented by the ellipses 354. In this case, the visualization 351 is populated by the template instance 341; the visualization 352 is populated by the template instance 342; the visualization 353 is populated by the template instance 343; and so forth. Accordingly, each of the visualizations is associated with particular computing logic. In this case, visualization 351 is associated with computing logic 331; visualization 352 is associated with computing logic 332; visualization 353 is associated with computing logic 333; and so forth.

Figure 3A:
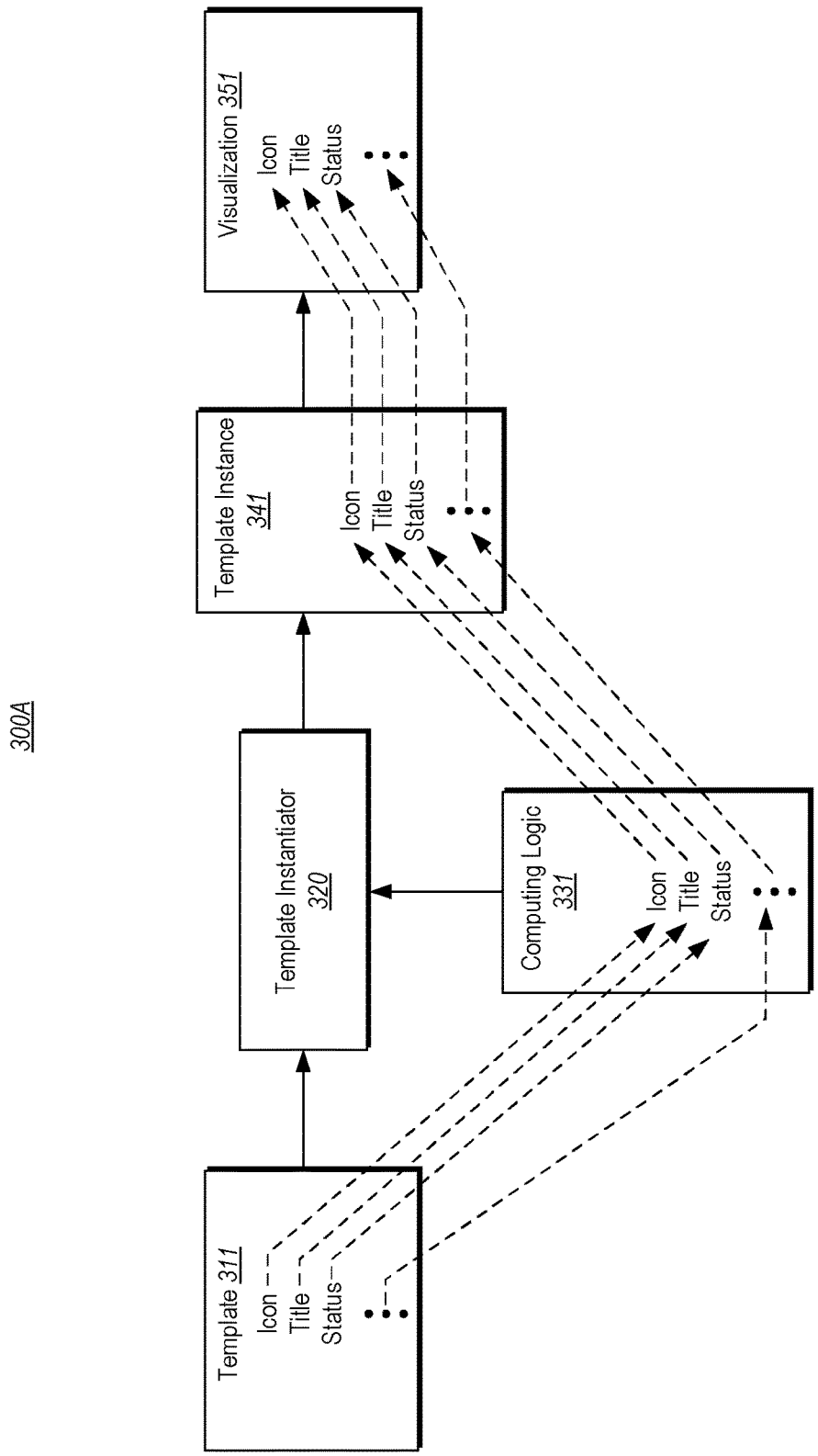
FIG. 3A illustrates an example of a presentation of a visualization, that is associated with a particular computing logic.

FIG. 3A illustrates an example of a particular template 311 being applied to a particular computing logic 311 and presenting a particular visualization 351. As illustrated, assume that template 331 includes parameters icon, title, status, and so forth. The ellipses represent that there may be a flexible number of parameters (one or more) included by template 311. The template instantiator 320 requests a value of each of the parameters (icon, title, status and so forth) included in template 311 from computing logic 331; at the same time the template instantiator 320 populates the parameters in the visualization template instance 341; finally, the template instance 342 populates the visualization 351 with the parameters that are associated with the values acquired from the computing logic 331.

Figure 4:
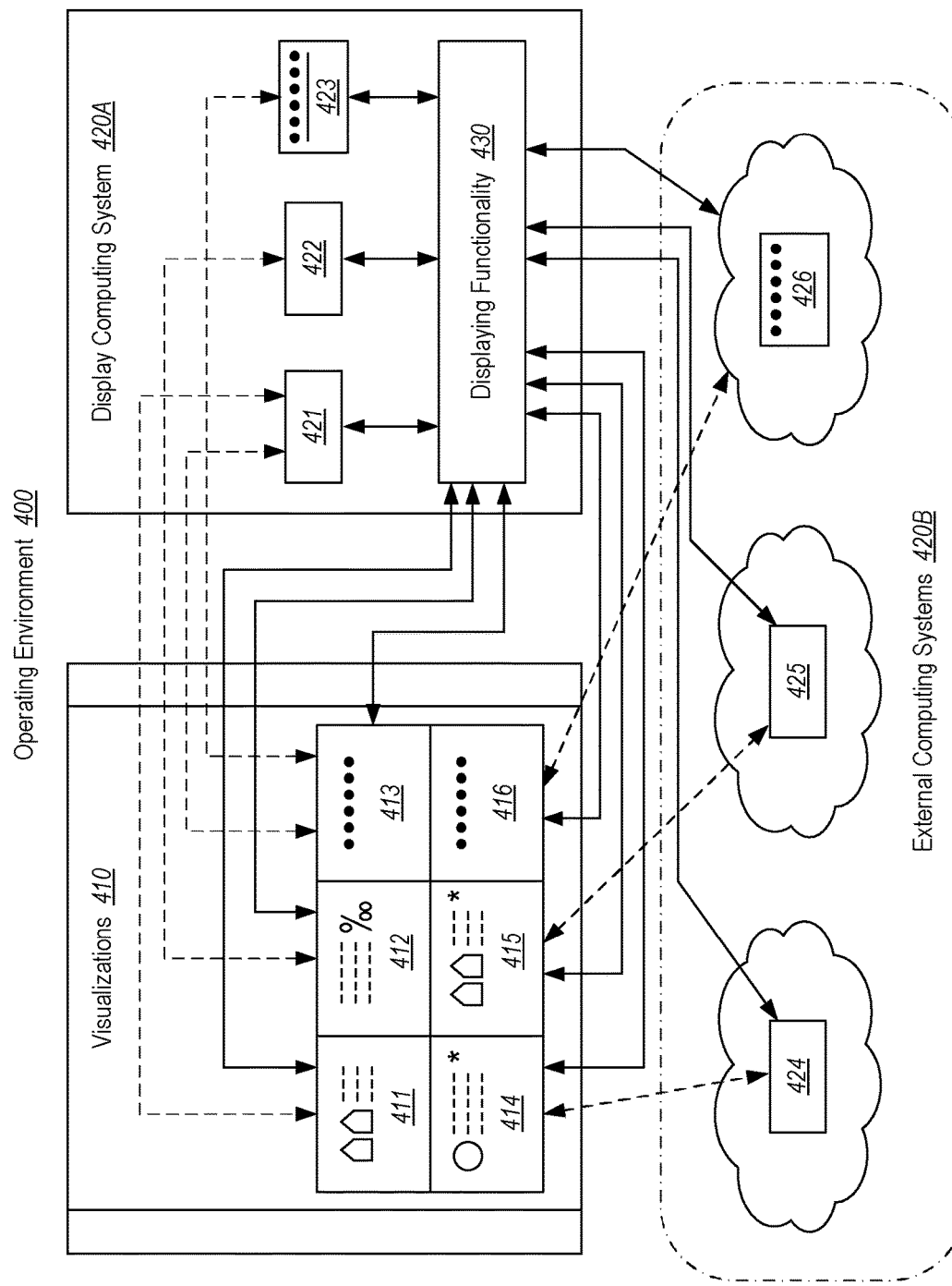
FIG. 4 illustrates an operating environment in which visualizations displayed on a display computing system may be interacted with in order to activate functionality in internal and/or external computing logic.

FIG. 4 shows an operating environment in which visualizations displayed on a display computing system may be interacted within in order to activate functionality in external computing logic. The operating environment 400 includes a display computing system 420A that presents various visualizations within a user interface portion 410, and external computing systems 420B that may be used to execute external computing logic.

The display computing system 420A runs external computing logic 421 and 422 amongst potentially other numbers (zero, one, or more or many more) as represented by the ellipses 423. The display computing system 420A also includes the displaying functionality 430 to create the user interface portion 410 that includes the multiple visualizations. The displaying functionality 430 has been previously illustrated in FIG. 3 and has been described in detail with respect to FIG. 3.

External computing systems 420B may include multiple different computing systems such as is symbolically represented by a cloud shape in FIG. 4. The external computing systems 420B runs the external computing logic 424 and 425 amongst potentially other numbers (one, or more or many more) as represented by the ellipses 426. Although each external computing system (again represented by a cloud) shown in FIG. 4 is illustrated as running but a single external computing logic, the principles of the present invention are not limited to that. There may be, for instance, multiple external computing logic running on any given single external computing system.

The display computing system 420A communicates with computing logic 421, 422 and 423 and computing logic 424, 425 and 426, and presents a visualization for each particular computing logic. Very much like FIG. 3, each visualization in FIG. 4 is associated with particular computing logic as represented by bi-directional dashed lines. For instance, in FIG. 4, the visualization 411 is associated with the computing logic 421; the visualization 412 is associated with the computing logic 422; and so forth. Similarly, the visualization 414 is associated with the computing logic 424; the visualization 415 is associated with the computing logic 425; and so forth. Since the displaying functionality 430 applies the same set of visualization templates for both internal and external computing logic as illustrated in FIG. 3, this allows the users to access both internal and external computing logic (such as applications or services) through uniformly presented interfaces.

FIG. 4A illustrates an example of a visualization 414 including a slider control 414A, which allows a user to adjust a percentage result of a parameter of computing logic 424. The external computing logic 424 may have a 2-way channel of communication with the display computing system. During the initial negotiation stage, the computing logic 424 communicates with the displaying computing system, and provides the initial value of the parameters (as illustrated in FIG. 3A) to the displaying functionality 430 (which includes a set of templates and a template instantiator illustrated in FIG. 3). Then the displaying functionality 430 populates visualization 414 with the initial value of the parameters acquired from computing logic 424, including setting an initial percentage scale of the slider control. After a user adjusts the value of the slider control 414A, visualization 414 detects that the value of the slider control is changed, and notifies computing logic 424 about the change. Then, computing logic 424 adjusts the percentage value of the corresponding parameter. For instance, the parameter with a percentage value may be a percentage brightness of a lamp, a speaker, a remote equipment, and so forth.

Figure 5:
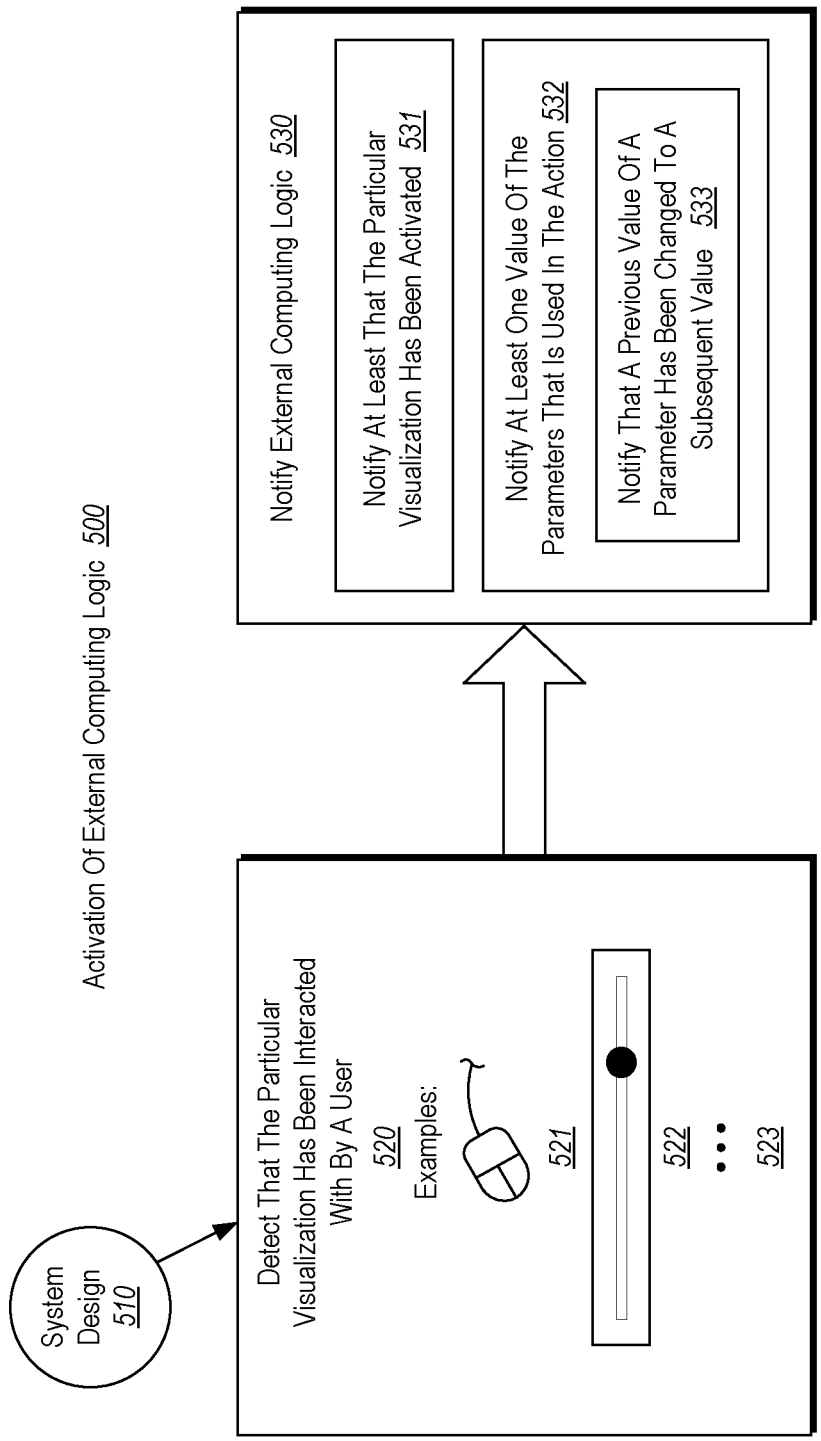
FIG. 5 illustrates an activation stage in which the computing system performs a method for initiating a particular action associated with the visualization.

After the computing system initially negotiates with the computing logic and presents the initial visualizations (illustrated in FIG. 3 and FIG. 4), users may interact with each of the visualizations to activate the associated computing logic (e.g., either internal or external computing logic). FIG. 5 is particularly described with respect to the associated computing logic being external computing logic. FIG. 5 illustrates functionality performed during an activation stage 500 (such as activation state 230 of FIG. 230). In FIG. 5, after a user interacts 510 with a particular visualization, the computing system detects 520 that the particular visualization has been interacted with by a user, and notifies 530 the particular external computing logic at least that the particular visualization has been activated.

As examples of interaction that may trigger such activation, there is, for instance, a single click 521, interfacing with a slider control 522, and so forth (as represented by the ellipses 523). For instance, a user could activate an external application by a single click; a user could also control an external machine by interfacing with a slider control; and so forth. Although not required, the notification might include at least one value of the parameter that is used in the particular action 522, such as that a previous value has been changed to a subsequent value 523.

After the external computing logic receives a notification, the external computing logic communicates with the computing system. Then, based on that communication, the display computing system causes a notification to be presented to the user.

Figure 6:
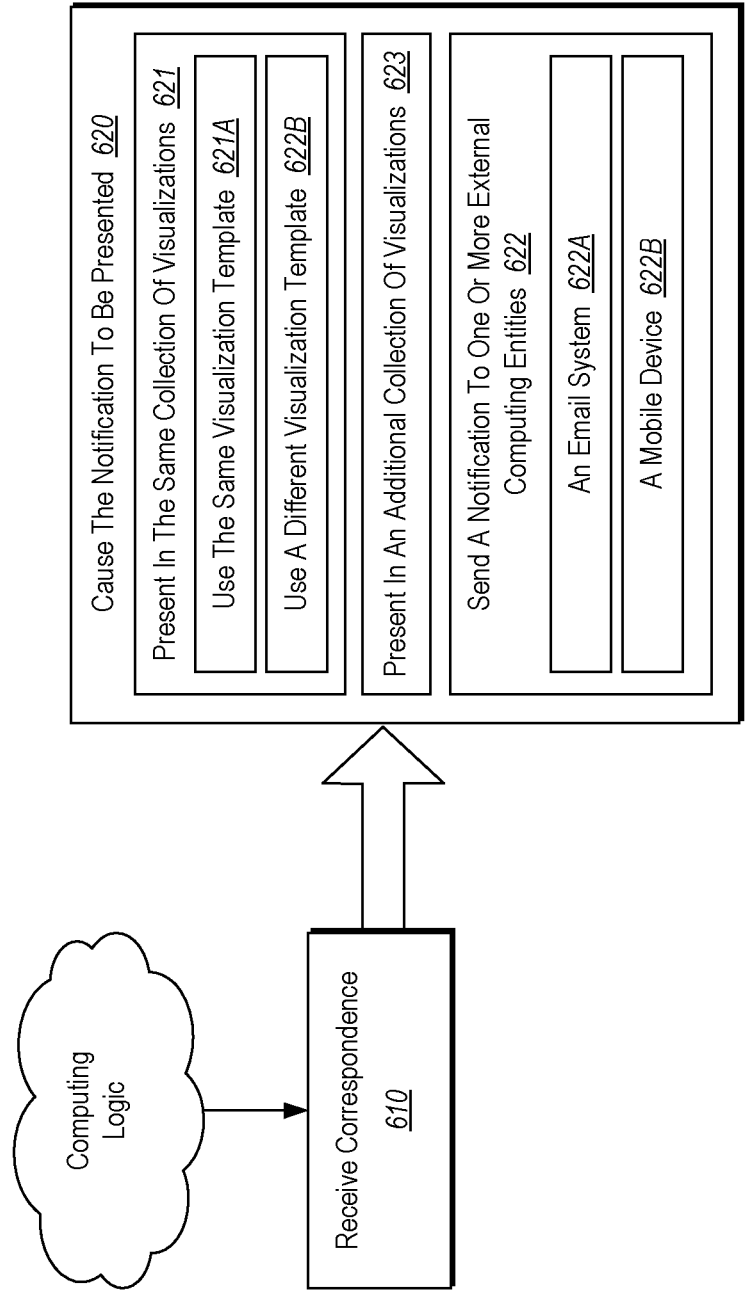
FIG. 6 illustrates another way that the presentation stage may operate in which the presentation is performed after the displaying computing logic receives a notification from the corresponding computing logic, instead of after the initial negotiation stage previously described.

FIG. 6 illustrates another way 600 that the presentation stage 220 may operate. In this way 600, the presentation is performed after the displaying computing logic receives a notification from the corresponding computing logic, instead of after the initial negotiation stage previously described. A notification can be displayed by a variety of methods. For instance, the notification may be displayed in the same collection of visualizations that initially presents the collection of the visualizations (act 621). In such case, the format and the position of the notification are defined by the same set of templates 310 illustrated in FIG. 3. For example, the template instantiator 320 may populate the notifications in the same visualization template instance (act 621A). By doing this, the display computing system could replace part of the content in the initial visualization with the notification. Alternatively, if the initial visualization only populates partial content as previously mentioned, the display system may more completely populate the content with the notification in the same visualization.

Alternatively, the template instantiator 320 could select a different template from the same set of templates illustrated in FIG. 3 and create a new visualization based on the new template chosen. In this situation, the display computing system may keep both the initial visualization and the new notification visualization. In that case, there would be two visualizations that are associated with the same computing logic. Alternatively, the display computing system may replace the initial visualization with the new visualization with the notification, to such that only one visualization (albeit a different visualization) is associated with particular computing logic.

Figure 7:
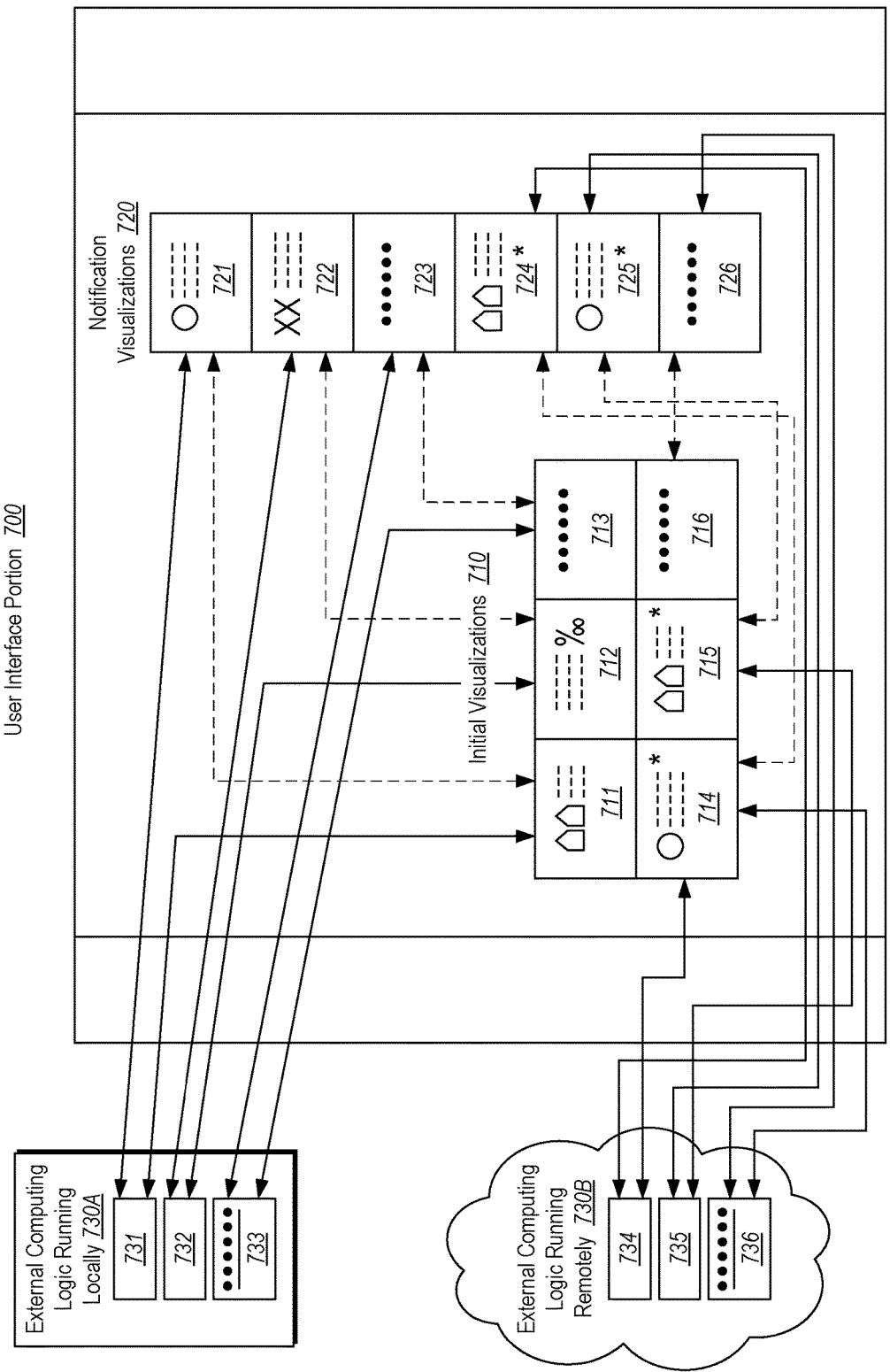
FIG. 7 illustrates a user interface portion that represents an example of the user interface portions of FIGS. 3 and 4, but which has an additional collection of visualizations for presenting notifications.

Additionally, the display computing system may provide an additional collection of visualizations and present the notifications in the additional collection of visualizations (referred hereinafter collectively as "notification visualizations"). The previous collection of visualizations is referred hereinafter as "initial visualizations". For instance, FIG. 7 illustrates a user interface portion 700 that represents an example of the user interface portion 350 of FIG. 3, and the user interface portion 410 of FIG. 4, except that the user interface portion 700 displays two collections of visualizations.

Similar to FIG. 4, the visualizations may be associated with external computing logic (regardless of whether the external computing logic runs within the display computing system or some other computing system), but now multiple visualizations may be associated with a single computing logic. Internal computing logic 730A is illustrated as including computing logic 731 and 732 among potentially other numbers (zero, one, more or many more) as represented by the ellipses 733. Computing logic 730B is illustrated as including computing logic 734 and 735 among potentially other number (or more or many more) as represented by the ellipses 736. Initial visualizations 710 were generated initially prior to any user interactions with the computing logic.

During initial negotiation, the computing system creates a collection of initial visualizations 710, each of which being associated with particular computing logic. The collection of initial visualizations 710 is similar to the collection illustrated by the user interface portion 410 of FIG. 4. The collection 710 includes multiple initial visualizations associated with computing logic. In this case, initial visualizations 711 and 712 (or other numbers as represented by the ellipses 713) are associated with computing logic 730A; and initial visualizations 714 and 715 (or other numbers as represented the ellipses 716) are associated with computing logic 730B. Initial visualization 711 is associated with computing logic 731; initial visualization 712 is associated with computing logic 732; and so forth. Similarly, the initial visualization 714 is associated with computing logic 734; the initial visualization 715 is associated with computing logic 735; and so forth.

After a user interacts with particular computing logic (via its initial visualization), the computing logic responds to the user's interaction, and creates a collection of notification visualizations 720. The notification visualizations 720 include multiple notification visualizations, each of which is also associated with external corresponding computing logic. In this case, notification visualizations 721 and 722 (or other numbers as represented by the ellipses 723) are associated with computing logic 730A. Furthermore, notification visualizations 724 and 725 (or other numbers as represented the ellipses 726) are associated with computing logic 730B. The notification visualization 721 is associated with computing logic 731; the notification visualization 722 is associated with computing logic 732; and so forth. The notification visualization 724 is associated with computing logic 734; the notification visualization 725 is associated with computing logic 735; and so forth.

The computing system may include a second set of templates, which is used to populate notification visualizations (e.g., the notification visualizations 720 of FIG. 7). Similar to the presentation method of the initial collection of the visualizations illustrated in FIG. 3, the notification visualizations may be created by an instance of a notification visualization template being selected from a set of notification visualization templates.

Referring back to FIG. 6, the notification may also be presented to one or more external computing entities 622 such as, for instance, an email system 622A, a mobile device 622B, and so forth. The display computing system may send an email, SMS (Send Text Message) or other functionality to perform the act of sending email or text notifications. The display computing system could also call a pre-existing email, SMS (Send Text Message) or other notification functionality to achieve the same goal. To receive email, text or other forms of notifications that are not presented on the display of the display computing system, the users have to input their email address, cell phone number and/or any identity information of their receiving devices in the display computing system and activate the particular notification functionality.

The display computing system may have additional sets of notification templates for notifications sent to external computing entities. For instance, short text templates could be used by both email and SMS notifications; long text, HTML, and/or multimedia templates could also be used by email and/or other forms of notifications; and so forth.

Moreover, the display computing system could present notifications for the same computing logic by more than one method at the same time. The display computing system could also present different notifications associated with the same computing logic in different methods. For instance, an urgent matter could be presented by a text message, a less urgent matter could be presented in a visualization or an email, and so forth. The display computing system may also allow users to select their preferred notification methods for particular computing logic or for particular kind of notifications. Ultimately, the display computing system may allow notifications presented by any variety of combinations of methods.

Accordingly, the principles described herein provide a model for a computing system to generate uniform interface visualizations that allows users to interact with external computing logic substantially instantaneously, and also a model for a computing system to present notifications when the external computing logic corresponds to a user's interaction with the associated interface visualization. The notifications may be the status of the external computing logic, a value change of a particular parameter, a reminder to the user, and so forth. This saves users' time to initiate actions of an external computing logic. For instance, users could start an external application with one click, as if they were starting an internal application. Users could also initiate an action of an external application without launching the application, and so forth.

The location and format of the visualizations are subject to one of the visualization templates. The visualization template may be selected by a user or the system, and/or may be determined by computing logic. This provides users a simple and uniform experience for interacting with various computing logic. Especially, this makes external applications more user friendly, because users interact with a uniform and consistent interface that they are familiar with. For instance, a user could adjust a parameter of an external machine by interfacing with a slider control, and so on.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for configuring a computing system to cause a computing logic to perform an action based on a visualization function, the method comprising:
an act of providing a user interface portion that includes a collection of a plurality of visualizations,
each of the plurality of visualizations being created by an instance of a visualization template that is populated, the visualization template being selected from a set of visualization templates which each define content types of the visualization,
each of the plurality of visualizations being associated with corresponding computing logic that populates the visualization with notifications, the position of the notification being defined by the corresponding visualization template, and at least one of the corresponding computing logic being external to an operating system of the computing system;
an act of negotiating with computing logic that is external to the operating system and that is associated with a visualization of the plurality of visualization such that when the visualization is activated, an action is to be performed, the action also being associated with at least one value of a parameter that is used in the action; and
upon detecting that the user has interacted with the visualization via at least one of a single click or interfacing with a slider control, an act of initiating the action by notifying the computing logic at least that the visualization has been activated and at least one change in value of the parameter that is used in the action;
wherein the visualization comprising at least one of an icon, widget, control, or display element.

2. The method in accordance with claim 1, the method further comprising:
an act of receiving correspondence from the corresponding computing logic; and
in response to the act of receiving, an act of causing a notification to be presented.

3. The method in accordance with claim 2, the act of causing a notification to be presented comprising:
an act of displaying a notification in the visualization associated with the computing logic.

4. The method in accordance with claim 2, the act of causing a notification to be presented comprising:
an act of sending a notification to one or more external computing entities.

5. The method in accordance with claim 4, the external computing entity comprising:
an email system.

6. The method in accordance with claim 5, the external computing entity comprising:
a mobile device.

7. The method in accordance with claim 2, the collection of the plurality of visualizations being a first collection of visualizations
the user interface portion further including a second collection of visualizations, each of the visualizations in the second collection being associated with corresponding computing logic that populates the visualization with notifications;
the act of causing a notification to be presented comprising:
an act of displaying a notification in a visualization of the second collection of visualizations associated with the computing logic.

8. The method in accordance with claim 1, the interaction by the user comprising:
a single click.

9. The method in accordance with claim 1, the interaction by the user comprising:
interfacing with a slider control.

10. A computer system, comprising:
one or more processors; and
one or more computer-readable storage devices having stored thereon computer-executable instructions that are executable by the one or more processors to cause the computer system to implement a method for configuring a computing system to cause a computing logic to perform an action based on a visualization function, the method comprising:
an act of providing a user interface portion that includes a collection of a plurality of visualizations,
each of the plurality of visualizations being created by an instance of a visualization template that is populated, the visualization template being selected from a set of visualization templates which each define content types of the visualization,
each of the plurality of visualizations being associated with corresponding computing logic that populates the visualization with notifications, the position of the notification being defined by the corresponding visualization template, and at least one of the corresponding computing logic being external to an operating system of the computing system;
an act of negotiating with computing logic that is external to the operating system and that is associated with a visualization of the plurality of visualization such that when the visualization is activated, an action is to be performed, the action also being associated with at least one value of a parameter that is used in the action; and
upon detecting that the user has interacted with the visualization via at least one of a single click or interfacing with a slider control, an act of initiating the action by notifying the computing logic at least that the visualization has been activated and at least one change in value of the parameter that is used in the action; wherein the visualization comprising at least one of an icon, widget, control, or display element.

11. The computing system in accordance with claim 10, the method further comprising:
an act of receiving correspondence from the corresponding computing logic after the act of notifying, and
in response to the act of receiving, an act of causing a notification to be presented.

12. The computing system in accordance with claim 10, the act of causing a notification to be presented comprising:
an act of displaying a notification in the visualization associated with the computing logic.

13. The computing system in accordance with claim 10, the act of causing a notification to be presented comprising:
an act of sending a notification to one or more external computing system or machine.

14. The method in accordance with claim 1, the visualization comprising a displayed control.

15. The method in accordance with claim 1, the visualization comprising a displayed element.

16. The computing system in accordance with claim 10, the visualization comprising a displayed control.

17. The computing system in accordance with claim 10, the visualization comprising a displayed element.

* * * * *